March 7, 1950     G. L. WHITMAN ET AL     2,499,709
SERVICE LINE WITH RUPTURABLE CONNECTOR
Filed April 19, 1946     2 Sheets-Sheet 2
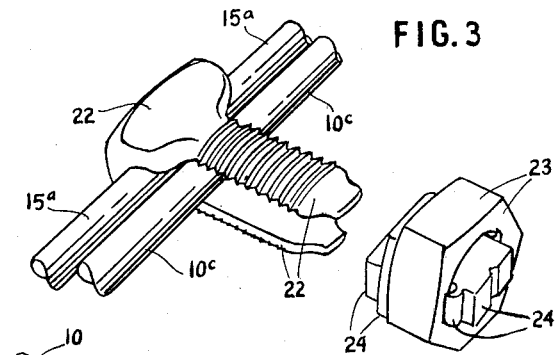
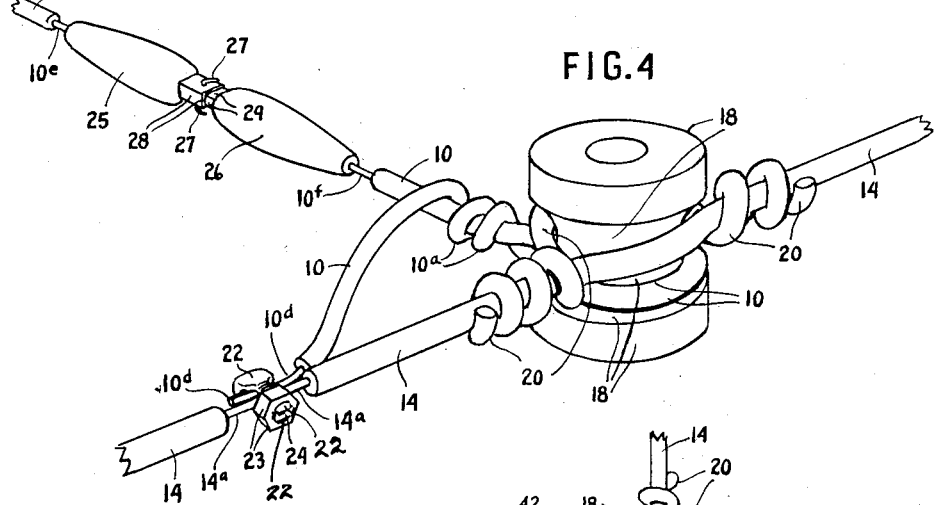
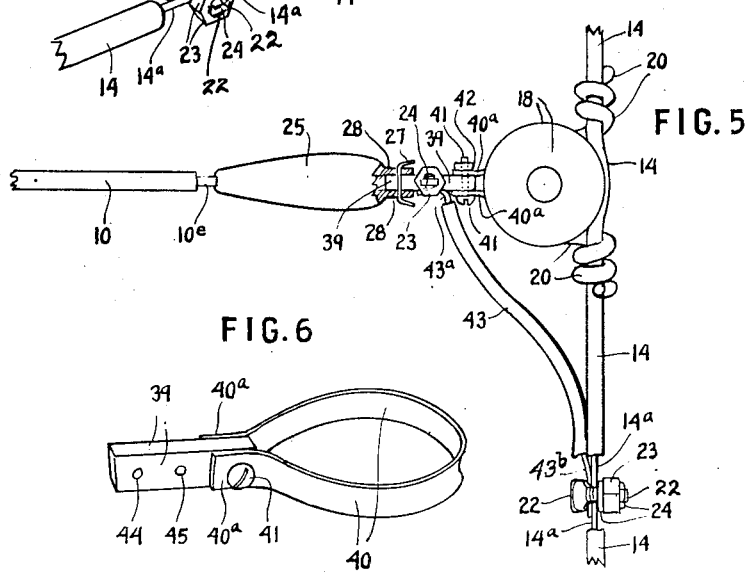
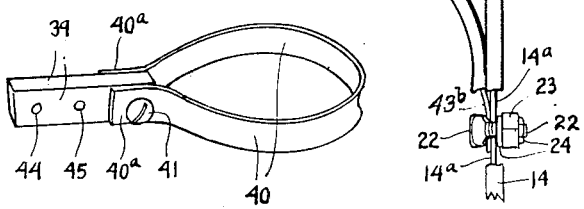
INVENTORS
George L. Whitman and
Percy F. Short
BY *Theodore E. Simonton*
ATTORNEY Patented Mar. 7, 1950

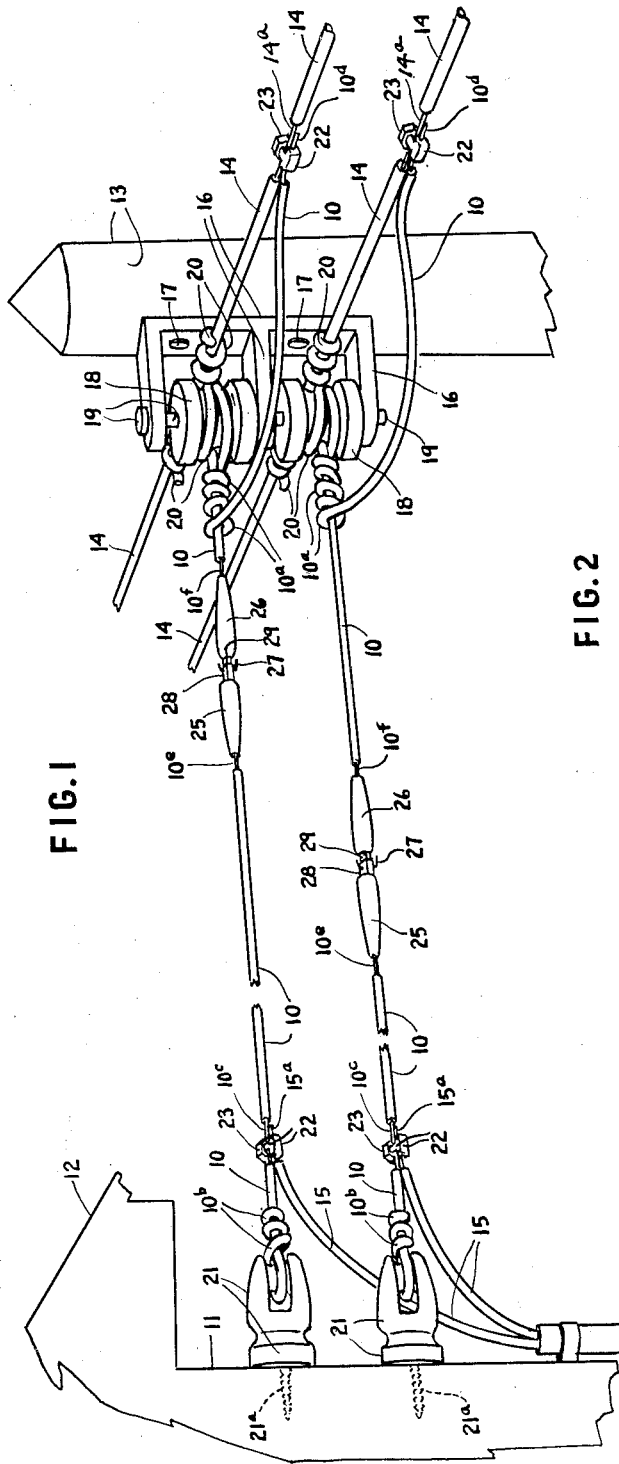

2,499,709

UNITED STATES PATENT OFFICE 2,499,709

SERVICE LINE WITH RUPTURABLE CONNECTOR

George L. Whitman and Percy F. Short, Weedsport, N. Y.

Application April 19, 1946, Serial No. 663,382

6 Claims. (Cl. 174—44)

The invention relates to improvements in service lines of electricity transmitting systems.

In electricity transmitting systems, it is common practice to tap customers' service lines to power transmission lines, the power transmission lines being supported at intervals on poles, and each service line being anchored to and suspended in the air between a building to be served and a pole supporting the power lines and also being electrically connected with a power line and a line extending into the building to be served. Such overhead or exposed service lines are frequently subjected to abnormal stresses which either break the lines, tear them from one or the other of their two anchorages, or tear away a part of a customer's building to which the service line is anchored. Such stresses may be caused, for example, by high winds, by accumulation of snow, sleet or ice on the service line, or by the line being struck by a falling tree or tree limb. When a service line is broken, or is torn away from a building, property damage and loss of service are the usual results, and frequently also a live or charged end or part of the broken service line is grounded with resultant life and fire hazards. Furthermore, repair of such broken service lines requires a considerable expenditure of time of skilled linemen, and these linemen usually cannot repair a service line installation when the line has carried away a part of a building to which it was anchored. In the latter case, the building must first be repaired to restore the building anchorage of the service line.

The present invention has for its general purpose the provision of a service line for electricity transmitting systems of the kind set forth which, while the line will break under abnormal stress, avoids the disadvantages above pointed out and may be quickly and easily restored to service.

Further purposes of the invention are to provide a service line for use in systems of the kind above set forth so constructed that the service line will be disconnected from a power transmission line at a predetermined point close to a pole which supports both lines, and to provide a service line having a separable and easily re-connectible joint therein which is closer to one of two suspending anchorages of the line than said anchorage is to the ground, said connection being separable by abnormal stress or pull on the service line between the suspending anchorages of the service line.

Another purpose of the invention is to provide in a system of the kind set forth superposed service lines connecting transmission lines with a building to be served and designed to rupture under abnormal stress and at a predetermined point conveniently reachable from a transmission line supporting pole with successive ones of the superposed service lines designed to rupture at different distances from the pole.

A further purpose of the invention is to provide a service line for systems of the kind set forth having between its pole and building anchorages a splicing means held connected by a shear pin.

Other purposes and advantages of the invention will appear from the following description of illustrative embodiments of the invention shown in the accompanying drawings.

In the drawings:

Figure 1 is a fragmentary perspective view illustrating one embodiment of the invention;

Figure 2 is a detail sectional view showing the safety splice employed in the service lines shown in Figure 1;

Figure 3 is an exploded perspective view showing the tap connection between each service line and the associated line extending into the building;

Figure 4 is a detail perspective view showing one of the service lines and power transmission lines of Figure 1 and their connections with each other and a pole supported insulator;

Figure 5 is a top plan view (partly in section) showing a modified construction; and Figure 6 is a detail perspective view of certain of the parts shown in Figure 5.

The construction shown in Figures 1 to 4 will first be described.

The service lines 10, two of which are shown, extend between insulators held respectively to the upper part of a building to be served and the upper part of a power transmission line supporting pole, one vertical side of the building being designated 11, the adjacent roof portion of the building being designated 12, and the power line supporting pole being designated 13. The power transmission lines 14, two of which are shown, are, as is common, secondary power lines supported by a line of poles, including the pole 13 shown, and connected in known manner through transformers (not shown) with primary power lines (not shown) also supported by the line of poles. Leading from the building are the usual insulated circuit wires or lines 15, two of which are shown. The service and power lines shown in this embodiment of the invention are insulated wires or wire cables and form with the insulated wires 15 parts of a transmission system or circuit of the two-wire type.

The anchorages of lines 14 to pole 13, the anchorages of lines 10 to the building and pole, and the tap connections of lines 10 with lines 14 and 15 shown are all well known, and may be varied if desired in accordance with known practices, and need be only briefly described.

The known insulator supporting bracket 16 is fastened to the upper portion of pole 13 by suitable fastening devices 17 and supports between its horizontally extending arms the two known spool-like insulators 18 which are removably held in place one above the other as is usual by the known headed metal pin 19 which extends through the axial bores of the insulators and through registering holes in the arms of the bracket. Each power transmission line 14 is held to a different one of the insulators 18 in known manner, a short length of insulated wire 20 being bent for this purpose around the insulator and its ends twisted spirally around the power line 14 at opposite sides of the insulator, as is common in the art. Each service line or wire 10 is anchored to a different one of the insulators 18 by passing the wire about the insulator between the heads of the latter and twisting the wire upon itself as shown at 10a adjacent the insulator, leaving an end portion of the wire for tapping to the adjacent power line.

Anchored to an elevated portion of the side 11 of the building, one directly under the other as is common in the art, are two known insulators 21 for suspending the service lines between the building and the insulators 18 on pole 13. As shown, these insulators are of the known kind having screw threaded metal stems 21a screwed into the building structure adjacent the roof of the building, and also having an eye for passage of a service line through the insulator. The service lines are anchored, as usual, to different ones of the insulators 21 by passing the service line through the insulator eye and twisting the adjacent end portion of the line about the suspended main stretch of the line adjacent the insulator as shown at 10b. The service lines thus extend one below the other between their anchorages.

Adjacent the pole 13, one end of one of the service lines is tapped to one of the power transmission lines and one end of the other service line is tapped to the other power transmission line, as is usual in the art. Adjacent the building, one end of one of the lines 15 is tapped to one of the service lines, and one end of the other line 15 is tapped to the other service line, as is usual in the art. Any known line tapping connections may be employed. As shown in Figures 1 and 3, a bared portion 15a of each insulated wire 15 is clamped to a short bared length 10c of its associated insulated service line or wire, at a point close to the service line anchoring insulator 21 by a known form of all-metal clamping device comprising a slotted bolt 22, a nut 23 and a wire clamping block 24, the block 24 being slidable in the slot in the bolt and being held to the nut for rotation of the nut about the block. Adjacent pole 13 a bared end portion 10d of each insulated service wire is clamped by one of the clamping devices 23—23—24 to a short bared length 14a of its associated insulated power line 14, as shown in Figures 1 and 4.

The improvements in the foregoing known transmission system now will be described.

According to the present invention, each service line of the transmission system is so constructed that, when subjected to abnormal tension or breaking stress between its points of anchorage to a transmission line supporting pole and to a building to be served, the service line will break between said anchorage points at a predetermined selected point very close to the anchorage of the service line to the pole. The distance from the pole to the selected breakage point is kept as short as possible, preferably from a few inches to a maximum of one yard, so that the ruptured service line may easily be reconnected by a lineman from the pole and also so that, when the line breaks a long "dead" end thereof will drop to the ground and a very short "live" end thereof will be sustained from the pole out of contact with the ground. In a transmission system with overhead power and service lines, the improved service lines will each rupture under abnormal stress, but at such a selected point that a broken service line may easily be repaired by a single lineman, short circuits and fire hazards are avoided, grounded live wires are avoided, and the service line will break under abnormal stress without damaging the building from which it is suspended. The distance between the selected breakage point of the service line and the anchorage of said line to the transmission line supporting pole 13 must be less than the distance between said anchorage and the ground, the latter distance commonly being several yards or more for overhead clearance for traffic.

While the weakening of the service line at a selected point for rupture thereat under abnormal stress may be effected in various ways, it is preferred and highly desirable that the line be so constructed that a single lineman may easily and quickly initially assemble the line and easily and quickly restore the line to service after rupture of the line. With the service line rupturable as above described, it will be obvious that the free end of a long dead length of the line anchored to the building may be carried up pole 13 by a lineman and connected to the free end of the very short length of the line anchored to the pole within convenient reach of the lineman from the pole. For facilitating initial assembly and also repair of a service line, rupturable as above described, the service lines of the system shown in Figures 1 to 4 are each preferably constructed as will now be described.

Close to the power line supporting pole anchorage of the service line, and preferably within the limits above set forth, the long stretch of the service line between said pole anchorage and the building anchorage of said line has introduced therein an electricity conducting splice which will break under a stress substantially less than that required to break the service line at any other point between its anchorages and, preferably, will break without affecting the service line anchorages.

This splice connects two bared and separated portions 10e and 10f of the insulated service line and comprises two conductive metal shells 25 and 26 separably joined by a metallic shear pin 27 and each provided with conductive means for gripping a different one of said service line portions 10e and 10f. At their adjacent ends, the shells 25 and 26 are formed respectively with a tubular metal sleeve portion 28 of rectangular cross-section and a metal plug portion 29 of similar cross-section telescopically and removably inserted in said sleeve portion. Portions 28 and 29 are provided with registrable holes through which the shear pin 27 extends to tie the shells together, the pin having its ends bent as shown to prevent accidental disengagement of the pin from the sleeve and plug portions. The shells and said sleeve and plug portions thereof are formed of suitable strong and corrosion resistant metal of good electricity conductivity such as hard copper or brass and the shear pin is of small cross-section and formed of a corrosion resistant metal of good conductivity but of substantially less shear resistance than the service line wire and shells, such metal for the shear pin preferably being aluminum or soft copper. The small cross-section of the pin will, however, alone provide a localized point of weakness in the service line.

While the bared portions 10e and 10f of the service line may be connected in various ways with the shells 25 and 26, it is preferred to provide each shell with a known type of wire-end gripping means shown in Figure 2. Said gripping means will be only briefly described. Each shell is provided at its outer end with an axial bore 30 through which a bared end of the service line is slidably insertive, and each shell is provided with a frusto-conical chamber 31 tapering toward bore 30. Housed in each said chamber and extending longitudinally thereof is a set of bar-like gripping jaws 32, the inner ends of which extend loosely through radial jaw spacing slots 33 in a disk-like spacer 34 slidable facewise thereof in chamber 31. Jaws 32 are formed of metal of the kind above set forth in describing the shells 25 and 26.

At their inner ends, the jaws in each shell are engaged by one end of a helical expansion spring 35 which urges the jaws toward the smaller end of chamber 31 to contract the set of jaws on the bared wire end to grip and hold the wire end. The other end of spring 35 abuts a disk-like abutment 36 which the spring 35 holds pressed against a contracted portion of the shell adjacent the inner end of the shell. The jaws are serrated across their inner wire-engaging faces. Preferably, each shell is formed with an internal annular rib 37 engageable by the outer ends of the jaws to limit projection of the jaws by the spring. The plug portion 29 of shell 26 may be formed integrally with, or otherwise fixed to, said shell. In the construction shown, the plug portion 29 and the body of shell 26 are welded together. When a service wire end is inserted in the shell, the set of jaws will open to receive the wire end, but pull tending to withdraw the inserted wire end, and the action of spring 35 on the jaws will cause the set of jaws to grip and hold the wire end against withdrawal from the shell. Each shell may be provided with a longitudinal slot 38 for insertion of a tool to compress the spring to release the grip of the jaws on the inserted wire end.

The modified embodiment of the invention shown in Figures 5 and 6 now will be described. In this embodiment, the construction is the same as that described in Figures 1 to 4, except as now will be pointed out. In the modified embodiment, the shell 26 and that part of the service line gripped thereby and anchored to insulator 18 and tapped to the associated power line 14 are omitted, and the following described parts are substituted therefor to form part of the service line.

A metal bar or plug 39 of rectangular cross-section similar to that of plug portion 29 is held at one end in socket portion 28 of the wire gripping device 25 by the shear pin 27, and said device is attached to the major stretch of service line wire 10 as in the embodiment of Figures 1 to 4. A resilient and divided metal ring or clip 40 embraces insulator 18 between the heads of the insulator and is formed at its ends with two substantially parallel ears 40a between which the other end of the bar or plug 39 is clamped by a bolt 41 and a nut 42 threaded on the bolt, thus providing a stretch of service line anchored to the building and to the adjacent transmission line supporting pole. To continue this service line to its associated power transmission line 14, there is provided a short length of insulated wire 43 having bared end portions 43a and 43b clamped respectively to bar 39, between the connections of said bar with shell 25 and clip 40, and to the bared portion 14a of a power transmission line 14 by clamping devices 22—23—24 of the kind heretofore described. Bar 39 is provided with bores 44 and 45 to receive respectively the shear pin and the bolt. The metal clip 40 from one to the other of its ears is preferably curved transversely, as shown, to fit closely about the usual concave surface of the stem portion of the known insulator 18, and said clip is formed of strong and corrosion resistant metal adapted to withstand stresses which will rupture the shear pin.

As shown in Figure 1, in multiple wire circuits, the rupturable splices interposed in the superposed service lines leading to a customer's building are so staggered from service line to service line that upon rupture of a line, the live end thereof cannot touch a splice or bared portion of another service line of the superposed series of lines. Preferably, the splices are stepped as shown with the splice of the uppermost service line closest to the service line anchoring insulators on pole 13.

We claim:

1. An electricity transmitting system of the kind including a pole-supported power transmission line, and a service line tapped to said transmission line adjacent a supporting pole for said transmission line and having an anchorage to said pole and an anchorage to a support remote from said pole suspending said service line above ground between said anchorages, characterized by the service line comprising two line sections extending toward each other from said anchorages, and means connecting said sections of the suspended service line and separable by abnormal stress imposed on the service line between said anchorages, said connecting means being located closer to the pole anchorage of the service line than the distance between said anchorage and the ground.

2. An electricity transmitting system, as claimed in claim 1, wherein said connecting means comprises two telescopically interfitted metal elements each positively mechanically secured to and in electricity transmitting connection with a different one of said service line sections, and a shear pin separably holding said elements in telescopic engagement.

3. In an electricity transmitting system of the kind in which a line of poles supports a plurality of power transmission lines to which are tapped service lines which extend away from the transmission lines, the improved service line installation which comprises a plurality of service lines anchored one below the other to one pole of said line of poles above ground and each tapped to a different one of said transmission lines, means anchoring said service lines above ground and one below the other from said pole and suspending said lines in superposed relation between their anchorages, each service line having introduced therein at a selected point between its anchorages a rupturable joint of less strength than the remainder of the anchored stretch of the line, said joints in the service lines being all located closer to the pole anchorages of the lines than said anchorages are to the ground, said service line joints being located different distances from the pole and progressively staggered outward from the pole from the uppermost to the lowermost ones of the service lines.

4. An overhead electricity transmission system of the class wherein there is tapped to a power transmission line a service line which extends out of doors and above ground between two anchorages for said line one of which is fixed to one of a series of spaced ground engaged supports which support the power transmission line at intervals therealong out of doors and above ground, characterized by said service line comprising two line sections which extend toward each other from different ones of said anchorages, and a line weakening splice which electrically connects and positively mechanically joins said two line sections at a point which is within convenient reach of a lineman from said one of said power transmission line supports and is closer to that one of said service line anchorages which is fixed to said support than said anchorage is to the ground.

5. In a device of the class described, the combination of, a street pole, a supporting bracket carried thereby spaced upwardly above the ground, an overhead electric power line, a lead-in conductor having one end secured to the bracket and connected electrically to the power line to take current from the same, means supporting the other end of the conductor normally to hold the conductor off the ground, said conductor being in two lengths, the length supported from the bracket and attached to the power line being of less length than the distance between the bracket and the ground, whereby said length when falling from the bracket cannot reach the ground, and a connector of the mechanical overload release type normally coupling together the adjacent ends of the two lengths of conductor.

6. A lead-in conductor for use in tapping off electric current from a street power line, said conductor provided at one end with means for supporting said end and for connecting the same to the power line and including a coupling of the mechanical overload release type located closely adjacent said supporting means, said coupling being of conductive material normally maintaining an electric path therethrough and responsive to an axial pull on the conductor materially in excess of its weight to cause the component parts of the coupling to separate and thus permit the balance of the conductor beyond the coupling to fall free from and thus become independent of the power line and de-energized.

GEORGE L. WHITMAN.
PERCY F. SHORT.

REFERENCES CITED

The following references are of record in the file of this patent:

UNITED STATES PATENTS

| Number | Name | Date |
| --- | --- | --- |
| 735,839 | Stiles | Aug. 11, 1903 |
| 980,341 | Roper | Jan. 3, 1911 |
| 1,517,602 | Trogner | Dec. 2, 1924 |
| 2,019,149 | Mack | Oct. 29, 1935 |
| 2,166,458 | Berndt | July 18, 1939 |
| 2,309,041 | Booker et al. | Jan. 19, 1943 |

FOREIGN PATENTS

| Number | Country | Date |
| --- | --- | --- |
| 17,316 | Sweden | Mar. 26, 1904 |
| 445,941 | Great Britain | 1936 |